United States Patent [19]

Carr et al.

[11] Patent Number: 5,781,331
[45] Date of Patent: Jul. 14, 1998

[54] OPTICAL MICROSHUTTER ARRAY

[75] Inventors: William N. Carr, Montclair; Xi-qing Sun, Kearny, both of N.J.

[73] Assignee: Roxburgh Ltd., Isle of Man

[21] Appl. No.: 787,307

[22] Filed: Jan. 24, 1997

[51] Int. Cl.$^6$ .................................................. G02F 1/01
[52] U.S. Cl. ........................... 359/288; 359/290; 359/291
[58] Field of Search ................................ 359/288, 290, 359/292, 294, 298, 291, 315, 318

[56] References Cited

U.S. PATENT DOCUMENTS

| | | | |
|---|---|---|---|
| 3,463,572 | 8/1969 | Preston, Jr. | 359/295 |
| 3,746,785 | 7/1973 | Goodrich | 359/291 |
| 4,698,602 | 10/1987 | Armitage | 359/294 |
| 4,786,149 | 11/1988 | Hoenig et al. | 359/291 |
| 5,424,866 | 6/1995 | Kikinis | 359/292 |
| 5,659,418 | 8/1997 | Yurke | 359/290 |

OTHER PUBLICATIONS

IEEE Proceedings–Micro Electro Mechanical Systems, 1990, pp. 128–131, M. Parameswaran et al., "CMOS Electrothermal Microactuators".

IEEE Proceedings–Micro Electro Mechanical Systems, 1995, pp. 310–315, Terunobu Akiyama et al., "A Quantitive Analysis of Scratch Drive Actuator Using Buckling Motion".

IEEE Transactions on Electron Devices, vol. 35, No. 6, Jun. 1988, pp. 758–763, Werner Riethmüller et al., "Thermally Excited Silicon Microactuators".

The Eighth International Conference on Solid–State Sensors and Actuators, and Eurosensors IX, Jun. 1996, pp. 416–419, G. Lin et al., "Design, Fabrication, and Testing of a C-Shaped Actuator".

Symposium on Micromechanical Systems, DSC–vol. 40, 1992, pp. 13–23, E. Obermeier et al., "Electrostatically Activated Micro–Shutter In (110) Silicon".

Technical Digest–Solid–State Sensor and Actuator Workshop, Jun. 1996, pp. 191–195, Yongli Huang et al., "Piezoelectrically Actuated Microcantilever for Actuated Mirror Array Application".

Technical Digest–Solid–State Sensor and Actuator Workshop, Jun. 1996, pp. 31–35, Sun et al., "Lateral In-Plane Displacement Microactuators with Combined Thermal and Electrostatic Drive".

Late–News Poster Session Supplemental Digest–Solid–State Sensor and Actuator Workshop, Jun. 1996, pp. 1–2, R. K. Gupta et al., "Pull–In Dynamics of Electrostatically–Actuated Beams".

Primary Examiner—Loha Ben
Attorney, Agent, or Firm—Ohlandt, Greeley, Ruggiero & Perle

[57] ABSTRACT

An optical shutter apparatus includes a source of illumination and a first aperture plate positioned in a path of light from the source of illumination. A cantilever shutter is positioned at each aperture in the aperture plate and includes at least two bonded layers, one being an electrically resistive layer which exhibits a first thermal coefficient of expansion (TCE) and the second layer exhibiting a second TCE that is different from the first TCE. A proximal end of the bonded layers is attached to the aperture plate at each aperture and a distal portion thereof covers the respective aperture when in position thereover. A controller applies signals to the first electrically resistive layer to cause a heating of the first and second layers and a resultant unequal expansion thereof. The expansion causes a flexure of the cantilever shutter and moves the distal portion thereof to either cover or uncover the aperture, which, when uncovered, allows transmission of the illumination therethrough.

20 Claims, 7 Drawing Sheets

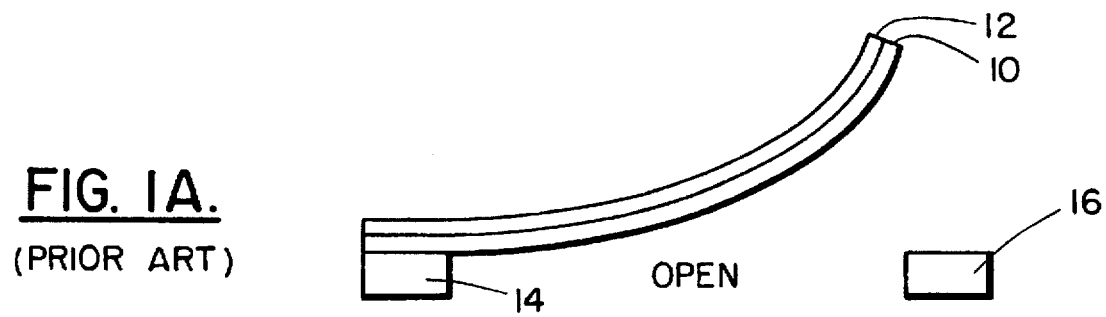
FIG. 1A. (PRIOR ART)
FIG. 1B. (PRIOR ART)
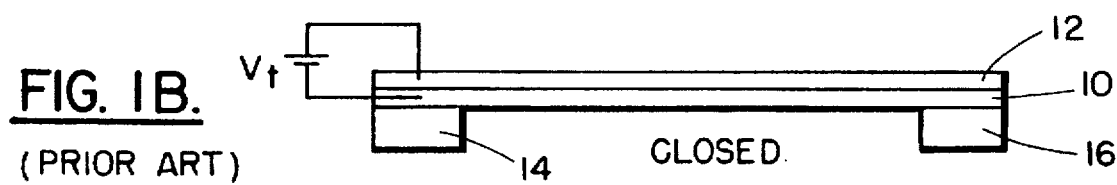
FIG. 2A. (PRIOR ART)
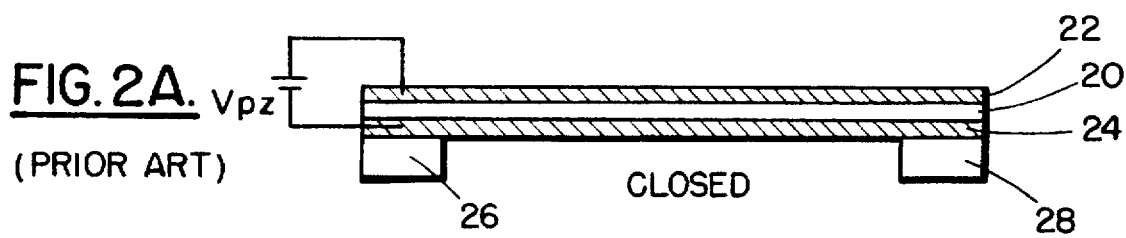
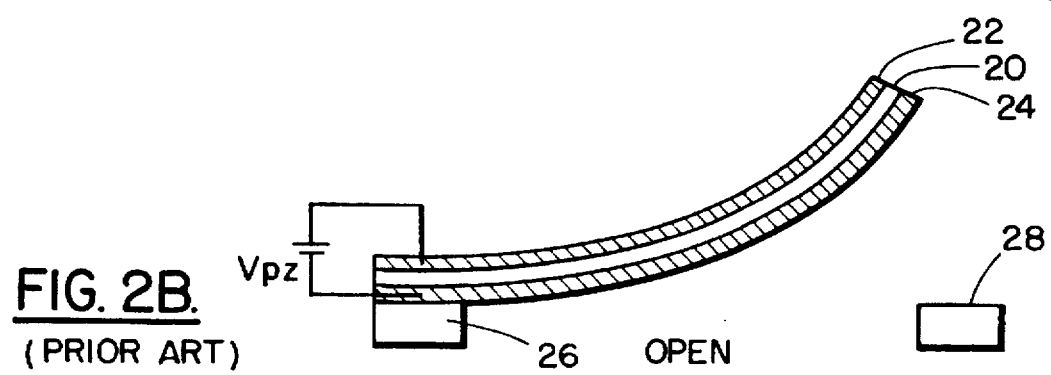
FIG. 2B. (PRIOR ART)
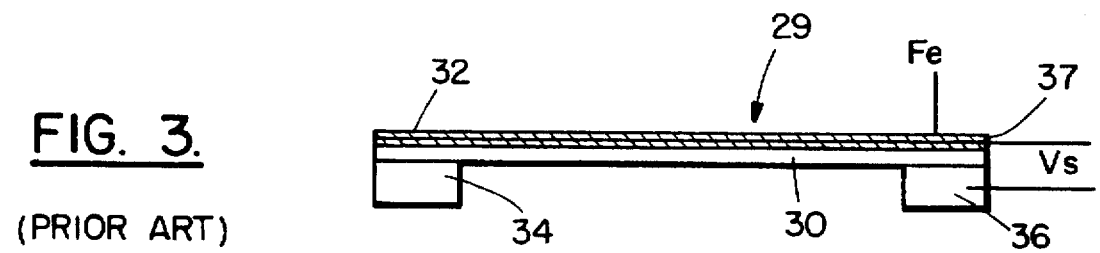
FIG. 3. (PRIOR ART)

5,781,331

OPTICAL MICROSHUTTER ARRAY

FIELD OF THE INVENTION

This invention relates to microstructures that are constructed utilizing semiconductor fabrication processes and, more particularly, to an optical microshutter array produced in accordance with such semiconductor fabrication processes.

BACKGROUND OF THE INVENTION

Silicon "micromachining" has been developed as a means for accurately fabricating small structures. Such processing involves the selective etching of a silicon substrate and the deposition thereon of thin film layers of semiconductor materials. Various sacrificial layers are employed to enable the fabrication of relatively complex interactive structures.

Silicon micromachining has been applied to the fabrication of micromachines that include rotary and linear bearings. Such bearings have spawned further development of electrically-driven motors which exhibit a planar geometry and lateral dimensions on the order of 100 microns or so. In addition to micromotors, various cantilever structures have also been constructed utilizing micromachining concepts.

FIGS. 1a and 1b illustrate a prior art cantilever device wherein a polysilicon layer 10 is bonded to a layer 12 of different composition. Both layers are attached, at one extremity, to a substrate 14. The thermal coefficients of expansion of polysilicon layer 10 and layer 12 are chosen as to be sufficiently different that, without an applied potential to create a heating action, the structure exhibits an arcuate form as shown in FIG. 1a. When, as shown in FIG. 1b, a voltage Vt is applied to a resistive portion of polysilicon layer 10, current flow causes a heating of both layers and unequal expansion results in a clockwise rotation of the arm until contact is made with substrate contact region 16.

The action of the cantilever structure of FIGS. 1a and 1b is much the same as a well known bi-metal thermal actuator widely used in thermostats. Further details of such structures can be found in "Thermally Excited Silicon Microactuators", Riethmuller et al., IEEE Transactions on Electron Devices, Volume 35, No. 6, June 1988, pages 758–763, and in "Design, Fabrication and Testing of a C-Shape Actuator", Lin et al., Proceedings Eighth International Conference on Solid State Sensors and Actuators, Stockholm, Sweden, Jun. 25–29, 1995, pages 418–420.

An example of a thermal actuator comprising a sandwich of polysilicon and gold can be found described in "CMOS Electrothermal Microactuators", Parameswaran et al., Proceedings IEEE Microelectro-Mechanical Systems, 11–14 Feb. 1990, pages 131.

As shown in FIGS. 2a and 2b, cantilever arms have also been constructed using piezoelectric films which exhibit a large $d_{31}$ characteristic. Such a piezoelectric film 20 has been sandwiched between a pair of electrodes 22 and 24 and coupled in a cantilever fashion to a contact 26. Application of a voltage Vpz between electrodes 22 and 24 causes a flexure of piezoelectric film 20 (see FIG. 2b), resulting in a counter-clockwise rotation of the cantilever arm and a disconnection of an electrical pathway between contacts 26 and 28.

In lieu of constructing a cantilever arm having an unattached free end, other prior art has employed a "tied-down" cantilever structure to provide a buckling action upon actuation by either a piezoelectric force or by a thermally actuated, differential expansion action. For instance, see "A Quantitative Analysis of Scratch Drive Actuator Buckling Motion", Akiyama et al., Proceedings IEEE Micro-Electromechanical Systems, Jan. 29–Feb. 2, 1995, pages 310–315. A further version of such a buckling system is described in "Lateral In-plane Displacement Microactuators with Combined Thermal and Electrostatic Drive", Sun et al., Solid-State Sensor and Actuator Workshop, Hilton Head, Jun. 3–6, 1996, pages 31–34.

Piezoelectrically actuated cantilever micro-devices have been proposed for a variety of applications. Huang et al., in "Piezoelectrically Actuated Microcantilever for Actuated Mirror Array Application", Solid-State Sensor and Actuator Workshop, Hiltonhead Island, S.C., June 3–6, pages 191–195, have suggested the use of a piezoelectrically actuated cantilever structure for control of the orientation of micro-mirrors. Such cantilever structures enable the redirection of an incident light beam to create an optical switching effect.

The application of electrostatic forces to provide both pull-down and repulsive forces in microactuators is known. A structure employing electrostatic forces is shown in FIG. 3, wherein a cantilever arm 29 comprises a polysilicon layer 30 affixed to an insulating layer 32 and spanning substrate contacts 34 and 36. When a voltage Vs is applied between contact 36 and across layers 30 and 32, an electrostatic force is created which provides a hold-down action between free end 37 of cantilever arm 29 and substrate contact 36.

Various electrostatically actuated devices can be found described in "Pull-in Dynamics of Electrostatically Actuated Beams", Gupta et al., Poster Session Supplemental Digest, Solid-State Sensor and Actuator Workshop, Hiltonhead Island, South Carolina, Jun. 3–6, 1996, pages 1, 2.

Electrostatic actuation has also been employed to control the action of a microshutter, wherein a moving electrode of aluminum, chromium, gold or doped polysilicon and a fixed counter-electrode is employed. The deflection of the moving electrode is controlled by electrostatic forces. The moving electrode rotates about an axis and employs a torsional-cantilever action. (See "Electrostatically Activated Micro-Shutter in (110) Silicon", Obermeier et al., DSC-Volume 40, Micromechanical Systems ASME, 1992, pages 13–22.

The prior art microshutter described above, because of its use of both torsional and cantilever actions, creates substantial stresses in the supporting cantilever between the shutter portion and the substrate. Further, because a relatively large mass is supported by a relatively thin connecting structure, fatigue failures can be expected to occur in the connecting structure, leading to a shortened lifetime span.

Accordingly, it is an object of this invention to provide an improved microshutter structure.

It is another object of this invention to provide an improved microshutter structure wherein thermal or piezoelectric actuation is employed to accomplish movement of the shutter member.

It is a further object of this invention to provide an improved microshutter, wherein torsional bending forces are avoided.

It is yet another object of this invention to provide an improved microshutter which can be structured in the form of an array and which responds to data signals to selectively transmit or block an illuminating beam.

SUMMARY OF THE INVENTION

An optical shutter apparatus includes a source of illumination and a first aperture plate positioned in a path of light from the source of illumination. A cantilever shutter is positioned at each aperture in the aperture plate and includes at least two bonded layers, one being an electrically resistive layer which exhibits a first thermal coefficient of expansion (TCE) and the second layer exhibiting a second TCE that is different from the first TCE. A proximal end of the bonded layers is attached to the aperture plate at each aperture and a distal portion thereof covers the respective aperture when in position thereover. A controller applies signals to the first electrically resistive layer to cause a heating of the first and second layers and a resultant unequal expansion thereof. The expansion causes a flexure of the cantilever shutter and moves the distal portion thereof to either cover or uncover the aperture, which, when uncovered, allows transmission of the illumination therethrough.

BRIEF DESCRIPTION OF THE DRAWINGS

FIG. 1a is a schematic view of a prior art thermally actuated cantilever microstructure in an open position.

FIG. 1b is a schematic view of the thermally actuated cantilever microstructure of FIG. 1a, in the closed position.

FIG. 2a is a schematic view of a prior art piezoelectrically actuated cantilever microstructure, in the closed position.

FIG. 2b is a schematic view of the prior art cantilever microstructure of FIG. 2a in the open position.

FIG. 3 illustrates a prior art microcantilever which utilizes an electrostatic potential to provide a hold-down force.

DETAILED DESCRIPTION OF THE INVENTION

The present invention uses microcantilevers in a two-dimensional array to construct a microshutter arrangement for optical applications. The individual apertures in the array are controlled to gate optical, ultraviolet or infrared beams of either coherent (collimated) or non-coherent radiation. Individual apertures are opened and closed using conventional address circuitry which is either synchronously scanned or asynchronously, individually addressable. Shutter portions of each microcantilever may be either opaque or may be constituted by thin film layers which enable selective optical filtering of an illuminating beam. The aperture array can be controlled to select specific passbands of radiation, at different aperture locations.

The present invention employs cantilever shutters that are comprised of either bimorph or multimorph thin films to enable opening and closing thereof, much like a hinged door over a fixed aperture opening. While thermal actuation is preferred, both piezoelectric and electrostatic-originating forces may also be employed.

Figure 4A:
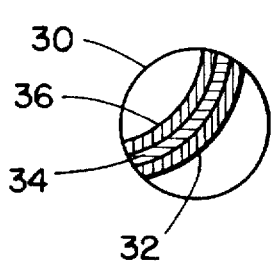
FIG. 4a is a side view of a microshutter structure (in the open position) incorporating the invention hereof.
Figure 4A:
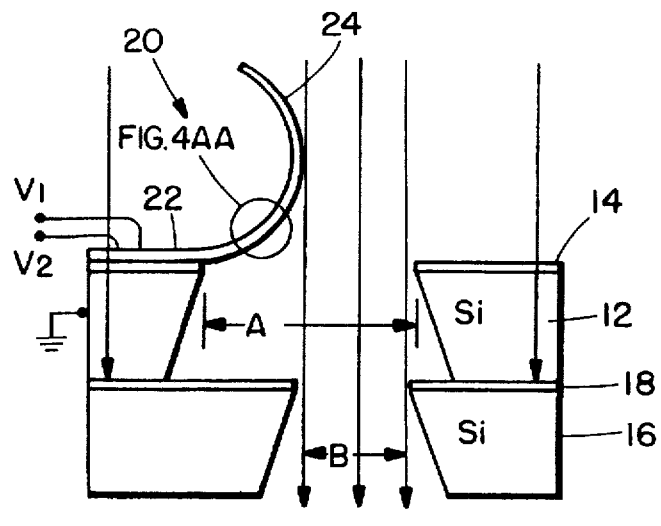
Figure 4B:
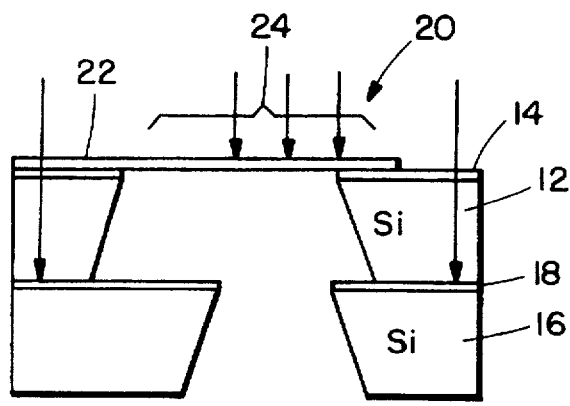
FIG. 4b is a side view of a microshutter structure (in the closed position) incorporating the invention hereof.
Figure 4C:
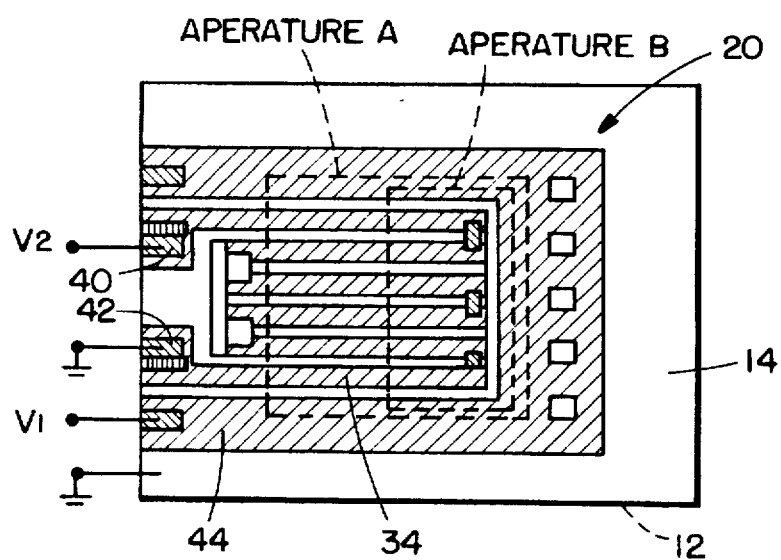
FIG. 4c is a plan view of the microshutter structure of FIGS. 4a and 4b.

Turning now to FIGS. 4a–4c, a preferred embodiment of a microshutter incorporating the invention hereof will be described. A first silicon substrate 12, having an upper oxide layer 14, is adhered to a second silicon substrate 16 which also has an upper oxide layer 18 deposited thereon. First silicon layer 12 has been etched to provide an aperture A which extends entirely through the thickness of layer 12.

A microshutter 20 includes a proximal portion 22 that is adhered to oxide layer 14. A distal portion 24 is dimensioned so as to cover aperture A when it is in an unflexed position, such as shown in FIG. 4b. In the flexed position as shown in FIG. 4a, however, microshutter 20 is curled to the left and exposes a region of aperture A where light may transit. An aperture B is etched in silicon substrate 16 and exhibits a lateral dimension which prevents any shadowing of the transmitted beam by microshutter 20 when it is in the flexed position.

Microshutter 20 comprises at least two layers which exhibit different thermal coefficients of expansion (TCE's). As shown in expanded region 30, microshutter 20 includes a low temperature oxide layer 32, a conductive/resistive polysilicon layer 34 and a high temperature silicon nitride (insulating) layer 36. Application of a current to polysilicon layer 34 causes a heating thereof and a concomitant heating of layers 32 and 36. Because the layers exhibit different TCE's, differential expansions occur in each of the layers, with layer 36 expanding more than layer 34, thereby forcing a straightening of microshutter 20 to the right as shown in FIG. 4b. When current is removed from polysilicon layer 34, the resulting cooling of microshutter 20 results in a counterclockwise rotation thereof to a position shown in FIG. 4a.

Turning to FIG. 4(c), polysilicon layer 34 can there be seen as having been etched into a serpentine-style resistance region which bridges electrodes 40 and 42. Application of a voltage V2 between contacts 40 and 42 results in a current through polysilicon resistive layer 34 to create the heating action described above. A further polysilicon layer 44 is positioned about the periphery of microshutter 20 and, when a voltage V1 is applied, provides an electrostatic hold-down force for microshutter 20.

More specifically, application of voltage V1 between polysilicon layer 44 and silicon substrate 12 (across insulating layer 14) results in an electrostatic force being applied between microshutter 20 and silicon substrate 12 and achieves a hold-down action.

Layers 32, 34 and 36 of microshutter 20 can be made sufficiently thin to be substantially optically transmissive. Under such circumstances, a further film can be deposited thereon which is optically selective to a given wavelength range. Thus, a film can be deposited on the distal shutter region 24 of optical shutter 20 which is selective for the infrared region, the visible region or the ultraviolet region, or to selected wavelengths within one of the aforesaid regions.

Figure 5A:
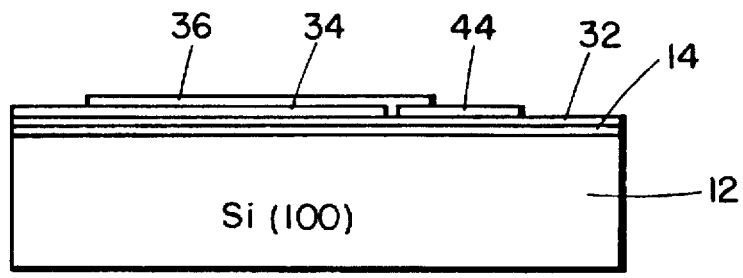
FIGS. 5a–5f show side views of a silicon structure as it is processed to provide the microshutter structure of FIGS. 4a–4c.
Figure 5B:
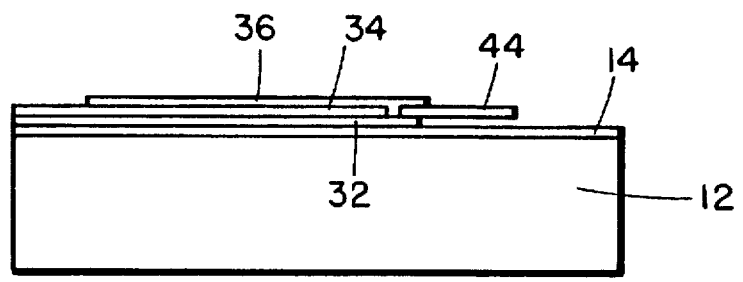

Turning to FIGS. 5a–5f, the procedure for fabrication of silicon layer 12 and microshutter 20 will be described. Starting with FIG. 5a, silicon substrate 12 has already had emplaced thereon (via additive deposition/etch procedures) a silicon nitride layer 36, polysilicon layers 34 and 44, low temperature oxide layer 32 and silicon nitride layer 14. Next, as shown in FIG. 5b, low temperature oxide 32 is etched to expose the underside of polysilicon layer 44 to enable its subsequent use as an electrostatic hold-down electrode.

Figure 5C:
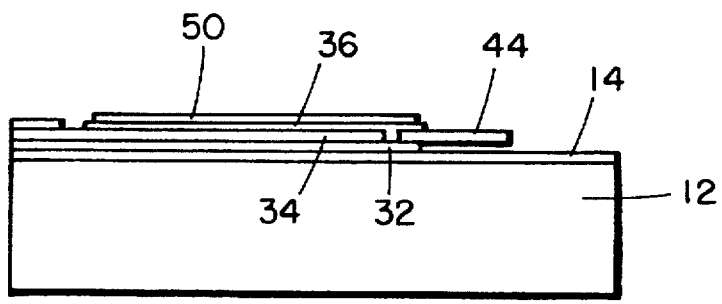
Figure 5D:
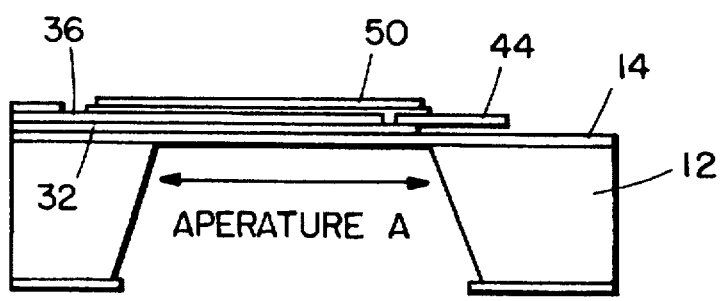

In FIG. 5c, an additional layer of aluminum 50 is sputtered onto silicon nitride layer 36 and is patterned to provide access to both polysilicon layers 34 and 44. Thereafter, as shown in FIG. 5d, aperture A is etched in the lowermost surface of silicon substrate 12 to expose silicon nitride layer 14. A special fixture device is used to protect the front side structures from the etch action.

Figure 5E:
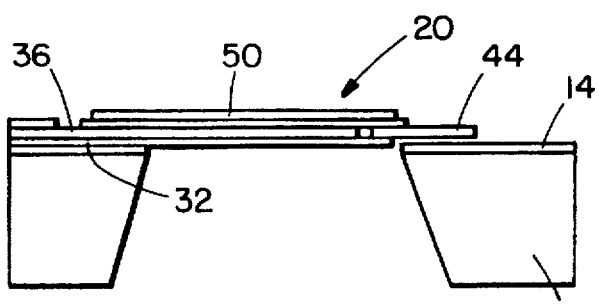
Figure 5F:
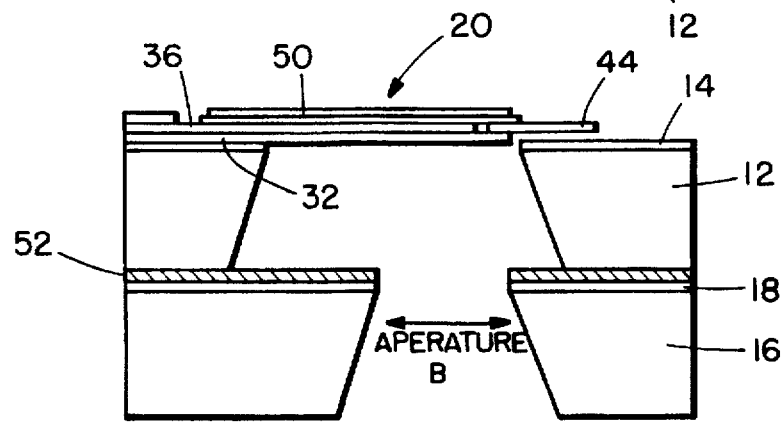

Next, as shown in FIG. 5e, a reactive ion etch is applied through aperture A to remove silicon nitride layer 14 from the lowermost surface of low temperature oxide layer 32. This action enables full release of shutter 20 and enables it to curl upwards naturally and to create the normally open condition of the microshutter. Thereafter, as shown in FIG. 5f, silicon wafer 16 is bonded to the lowermost surface of silicon layer 12 so as to align aperture B with aperture A. Lower silicon wafer 16 preferably incorporates a metal layer, 52, on top of silicon nitride layer 18 to provide opacity to incident radiation.

Figure 6:
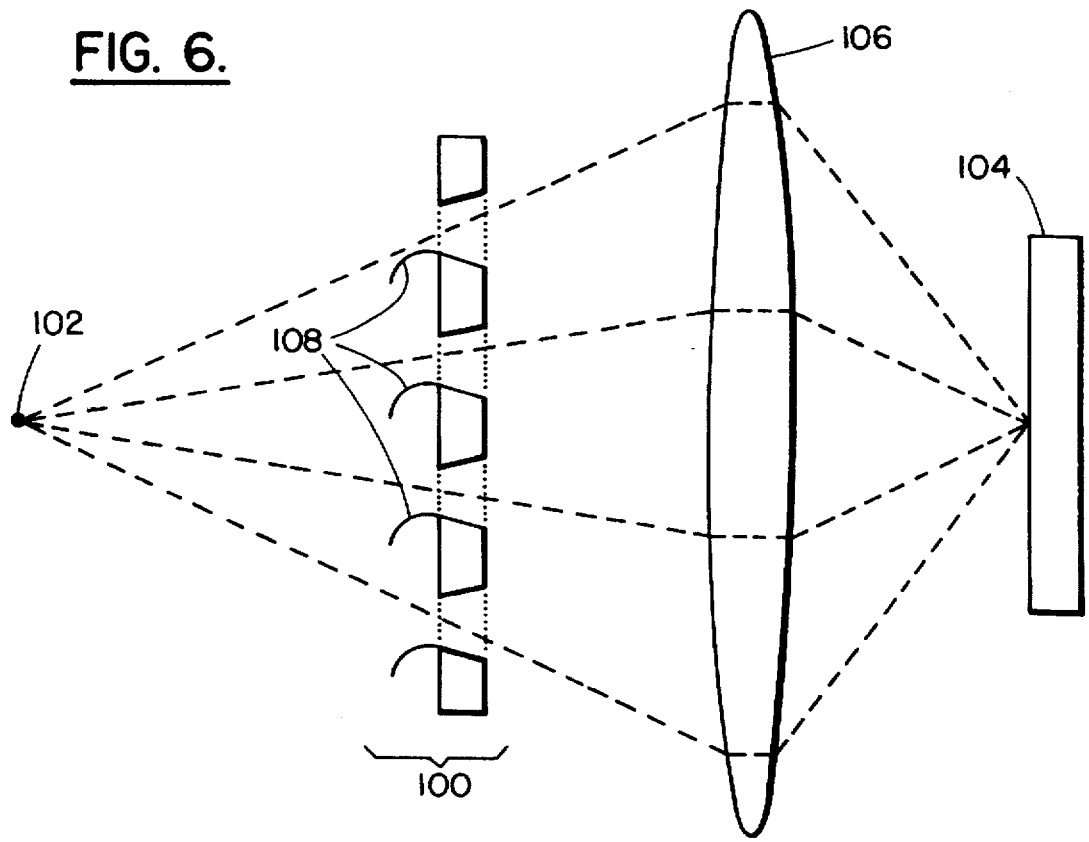
FIG. 6 is a schematic side view of a microshutter array which employs a lens to focus an optical beam onto a photosensor.

Referring now to FIGS. 6–11, structures incorporating microshutter arrays employing the invention, will be described. In FIG. 6, a microshutter array 100 is positioned between a source of illumination 102 and a photoreceptor 104. A lens 106 is positioned to focus light which passes through shutter array 100 onto photoreceptor 104. Individual microshutters 108 in microshutter array 100 are individually controllable by signals supplied from a connected controller.

Figure 7:
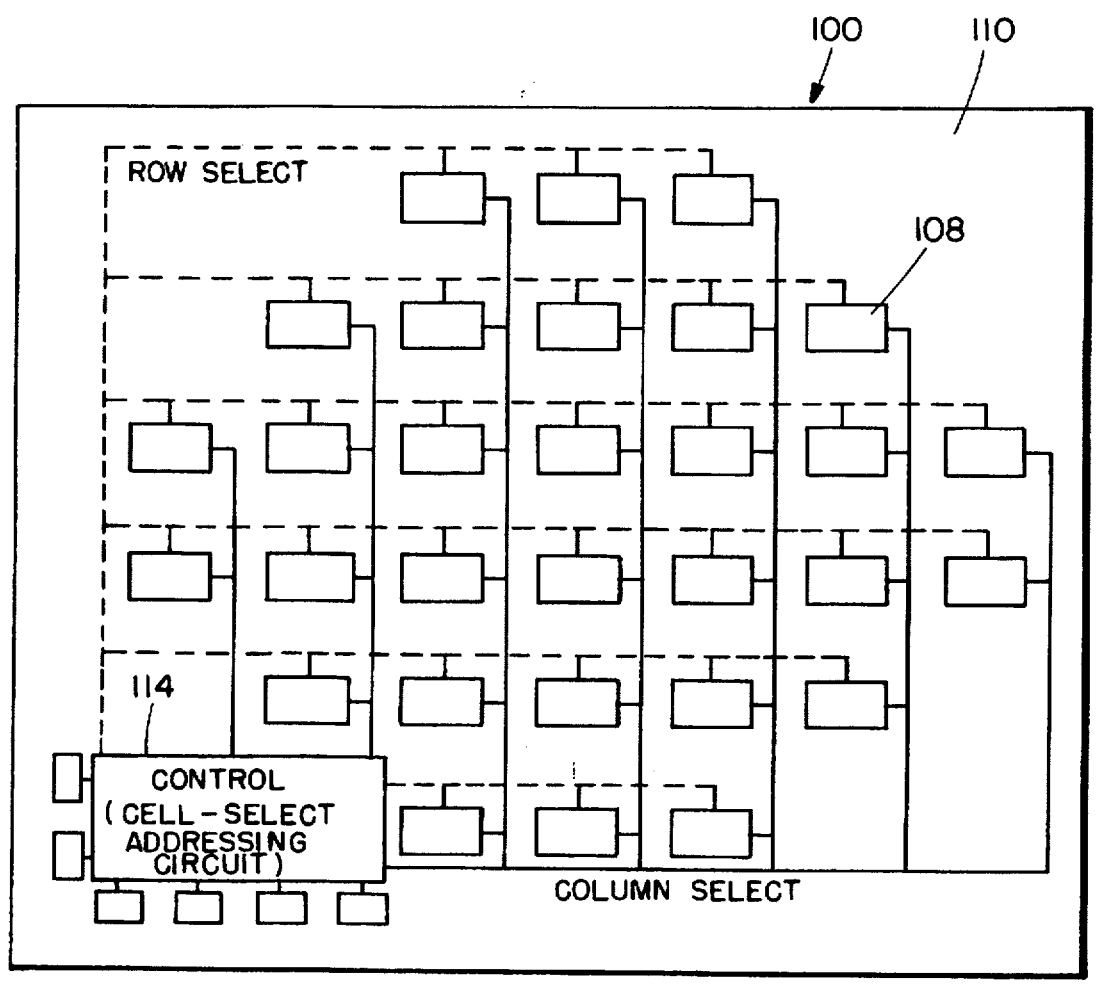
FIG. 7 is a plan view of an integrated shutter array, such as that employed in FIG. 6.

Details of microshutter array 100 are shown in FIG. 7 wherein a plurality of microshutters 108 are positioned in an array on a substrate 110. XY conductor patterns are positioned on substrate 110 and enable individual selection of a single microshutter 108 or a row or column of microshutters 108. A controller 114 provides cell-select signals to enable operation of one or more of the array-arranged microshutters 108.

Figure 8:
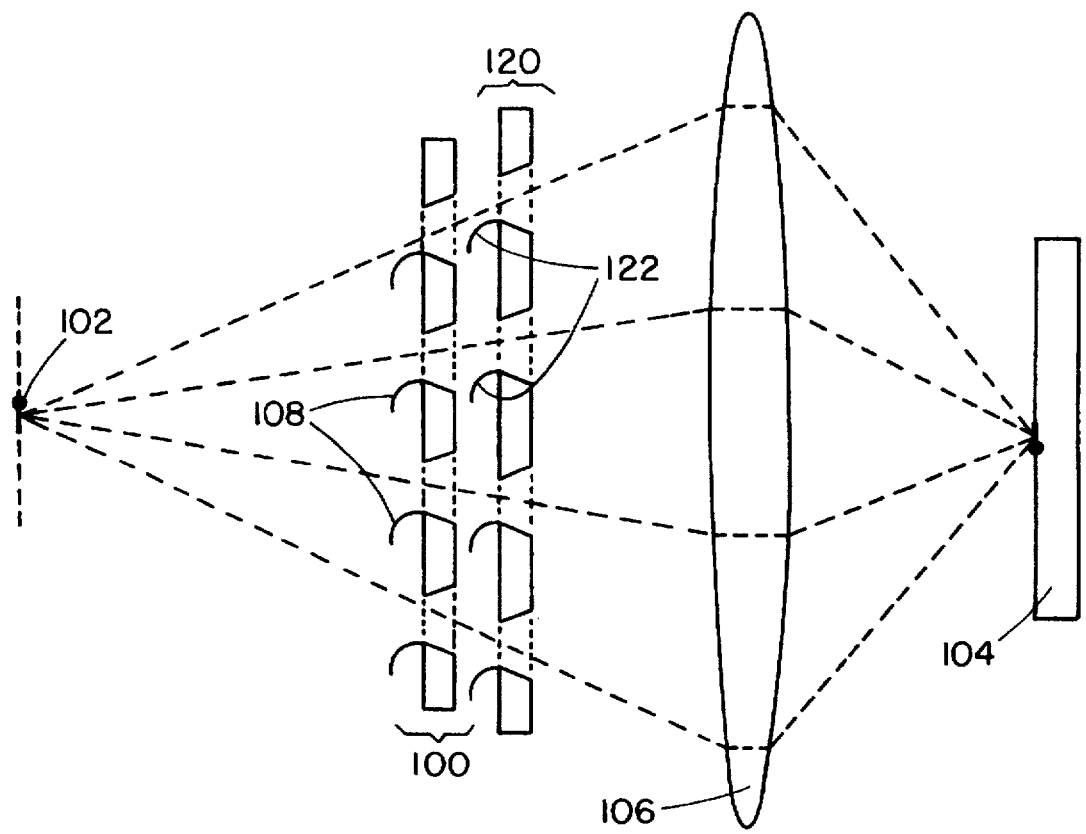
FIG. 8 is a schematic side view of a shutter arrangement wherein first and second microshutter arrays are employed and the second microshutter array provides optical filtering of illuminating beams gated by the first microshutter array.

In FIG. 8, the microshutter structure shown in FIG. 6 has been modified by inclusion of an additional microshutter array 120. In this instance, each of the microshutters 122 in microshutter array 120 is configured to include an optical filter layer thereon. Thus, by appropriately controlling microshutter array 120, illumination passing through microshutter array 100 can be subjected to a filter action or not, in dependence upon control signals applied to individual microshutters 122 in microshutter array 120. Thus, if microshutter arrays 100 and 120 are employed in a camera arrangement, the camera can exhibit either a sensitivity to visible light, or to infrared light, as the case may be, dependent upon control signals applied to microshutters 122 in microshutter array 120. Further, by appropriately opening or closing the individual microshutters in microshutter array 100, the effective aperture of the camera can be controlled.

Figure 9:
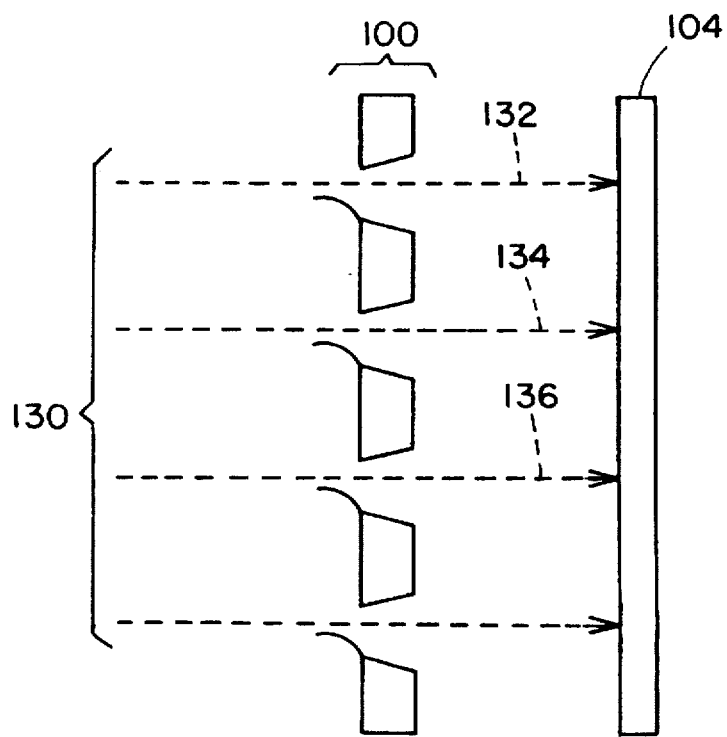
FIG. 9 illustrates a schematic of a microshutter array which is illuminated by a collimated beam.

While FIGS. 6 and 8 illustrate the use of an incoherent light source 102 as the source of illumination, a coherent light source 130, as shown in FIG. 9, may be employed in combination with microshutter array 100 and photoreceptor 104. Under such conditions, photoreceptor 104 preferably comprises plural optical detectors, arrayed to detect the presence or absence of one or more gated, collimated light beams 132, 134, 136, etc. In such manner, the presence or absence of a light beam can be detected and their individual modulations (if any) detected and fed to further demodulation circuitry.

Figure 10:
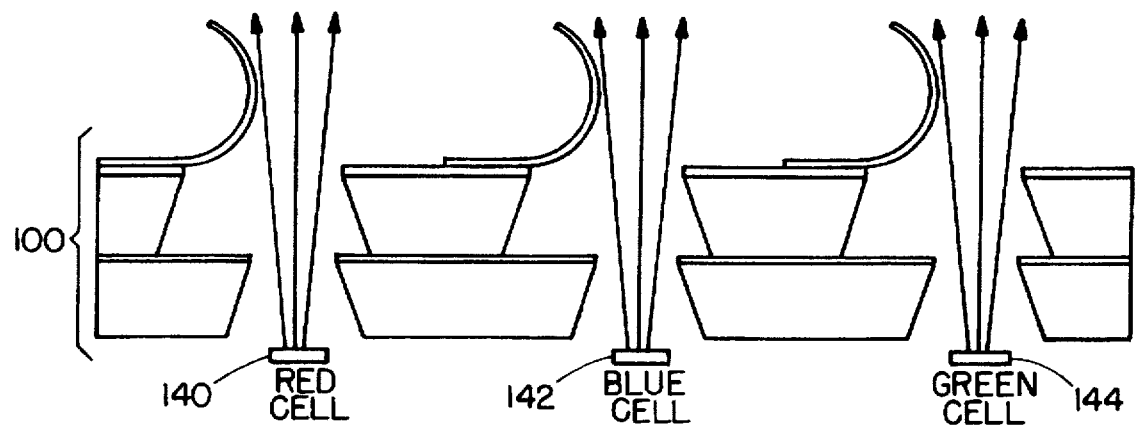
FIG. 10 illustrates an application of a microshutter array incorporating the invention to a color display unit.
Figure 11:
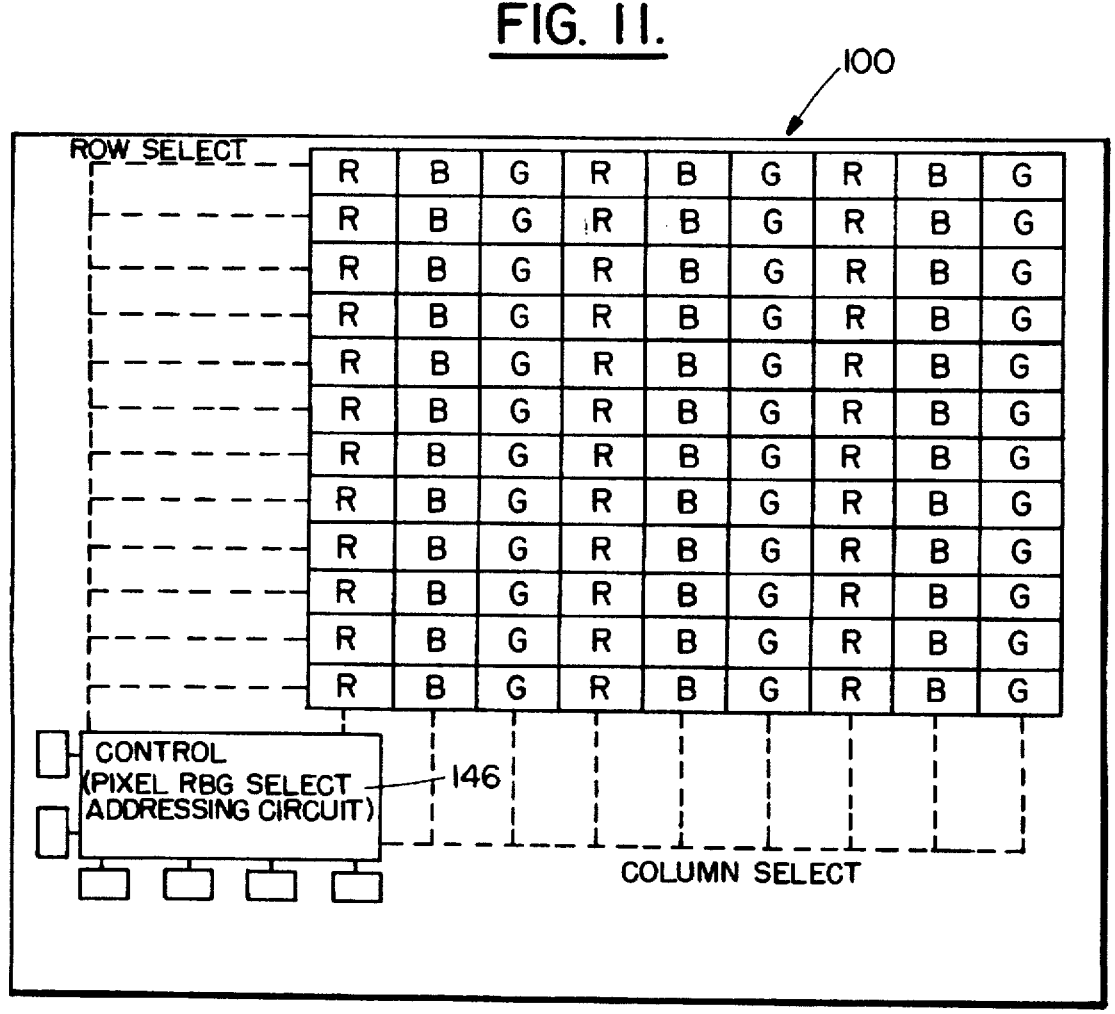
FIG. 11 illustrates a plan view of an integrated microshutter array such as that shown in FIG. 10.

In FIG. 10, a microshutter array 100 is employed in combination with red, blue and green light emitters 140, 142, and 144. A plan view of optical shutter array 100, integrated onto a microchip, is shown in FIG. 11 and includes row/column select circuitry which is operated by controller 146. By selectively gating the red, blue, green cells 140, 142 and 144, a color display can be achieved. Each of cells 140, 142 and 144 is supported on a substrate (not shown) which is juxtaposed to the lower surface of shutter array 100, thereby creating a flat display configuration.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An optical shutter apparatus comprising:

a source of illumination;

a first aperture plate positioned in a path of light from said source of illumination and including plural apertures;

a cantilever shutter positioned at each of said apertures, each cantilever shutter comprising;

at least two bonded layers including a first, electrically resistive layer exhibiting a first thermal coefficient of expansion (TCE) and a second layer exhibiting a second TCE that is different from said first TCE;

a proximal end attached to said aperture plate adjacent an aperture and a distal portion sized to cover said aperture when in position thereover; and control means for applying a signal to said first electrically resistive layer to cause a heating of said layers and a resultant unequal expansion thereof to cause a flexure therein which moves said distal portion to either cover or uncover said aperture, when uncovered, allowing transmission of said illumination therethrough.

2. The optical shutter apparatus as recited in claim 1, wherein a conductive layer is positioned on said second layer and (ii) said first aperture plate is at least partially conductive, said control means applying a dc potential between said aperture plate and said conductive layer when said aperture is covered to exert an electrostatic hold-down force on said distal portion of said cantilever shutter.

3. The optical shutter apparatus as recited in claim 1, wherein said first layer exhibits a thinner thickness in said distal portion than a thickness of said second layer in said distal portion to enable a greater flexure of said distal portion upon said heating.

4. The optical shutter apparatus as recited in claim 1, wherein said first aperture plate is comprised of first and second silicon layers, an aperture opening in said second silicon layer exhibiting a lesser cross-section than a co-located aperture opening in said first silicon layer.

5. The optical shutter apparatus as recited in claim 1, wherein said first aperture plate comprises an array of said apertures and said control means selectively open or closes individual ones of said apertures in accordance with data states.

6. The optical shutter apparatus as recited in claim 5, wherein said array of said apertures is one dimensional.

7. The optical shutter apparatus as recited in claim 5, wherein said array of said apertures is two dimensional.

8. The optical shutter apparatus as recited in claim 5, further comprising:

an array of photodetectors for detecting illumination transmitted through said apertures.

9. The optical shutter apparatus as recited in claim 5, further comprising:

a second aperture plate aligned with said first aperture plate and including a cantilever shutter at each aperture therein, each cantilever shutter in said second aperture plate including a distal portion which is at least partially transmissive of said illumination, but provides a filter action upon said illumination, said control means further operative to selectively open or close individual ones of said cantilever shutters in said second aperture plate in accordance with data states.

10. The optical shutter apparatus as recited in claim 9, wherein said filter action selectively passes illumination in one of: infra-red, visible and ultra-violet optical ranges.

11. The optical shutter apparatus as recited in claim 9, further comprising:

optical detection means for responding to incident illumination;

lens means positioned between said second aperture plate and said optical detection means for focussing illumination transmitted through said first aperture plate and second aperture plate onto said optical detection means.

12. The optical shutter apparatus as recited in claim 5, further comprising:

optical detection means for responding to incident illumination;

lens means positioned between said first aperture plate and said optical detection means for focussing illumination transmitted through said first aperture plate onto said optical detection means.

13. An optical shutter apparatus comprising:

a source of illumination;

a first aperture plate positioned in a path of light from said source of illumination and including plural apertures;

a cantilever shutter positioned at each of said apertures, each cantilever shutter comprising;

plural bonded layers including a first layer, and second and third piezoelectric layers arranged about said first layer in a sandwich fashion;

a proximal end attached to said aperture plate adjacent an aperture and a distal portion sized to cover said aperture when in position thereover; and control means for applying signals to said second and third piezoelectric layers to cause relative movement between said second and third layers and said first layer, resulting in a flexure of said cantilever shutter which moves said distal portion to either cover or uncover said aperture, said aperture, when uncovered, allowing transmission of said illumination therethrough.

14. The optical shutter apparatus as recited in claim 13, wherein a conductive layer is positioned on said cantilever shutter and (ii) said first aperture plate is at least partially conductive, said control means applying a dc potential between said aperture plate and said conductive layer when said aperture is covered to exert an electrostatic hold-down force on said distal portion of said cantilever shutter.

15. The optical shutter apparatus as recited in claim 13, wherein said second piezoelectric layer exhibits a thinner thickness than a thickness of said third piezoelectric layer portion to enable a flexure of said distal portion towards said second piezoelectric layer upon application of said signals.

16. The optical shutter apparatus as recited in claim 13, wherein said first aperture plate is comprised of first and second silicon layers, an aperture opening in said second silicon layer exhibiting a lesser cross-section than a co-located aperture opening in said first silicon layer.

17. The optical shutter apparatus as recited in claim 13, wherein said first aperture plate comprises an array of said apertures and said control means selectively open or closes individual ones of said apertures in accordance with data states.

18. The optical shutter apparatus as recited in claim 17, wherein said array of said apertures is one dimensional.

19. The optical shutter apparatus as recited in claim 17, wherein said array of said apertures is two dimensional.

20. The optical shutter apparatus as recited in claim 13, further comprising:

an array of photoreceptor for detecting illumination transmitted through said apertures.

* * * * *